United States Patent [19]

Turner

[11] 4,213,886

[45] Jul. 22, 1980

[54] TREATMENT OF ALUMINUM FLAKE TO IMPROVE APPEARANCE OF COATING COMPOSITIONS

[75] Inventor: Robert L. Turner, Troy, Mich.

[73] Assignee: E. I. Du Pont de Nemours and Company, Wilmington, Del.

[21] Appl. No.: 955,649

[22] Filed: Oct. 30, 1978

Related U.S. Application Data

[63] Continuation of Ser. No. 800,065, May 24, 1977, abandoned, which is a continuation-in-part of Ser. No. 588,609, Jun. 20, 1975, abandoned.

[51] Int. Cl.$^2$ .......................... C08K 9/04; C08K 9/06
[52] U.S. Cl. .......................... 260/29.6 MM; 106/290; 106/308 Q; 106/308 N; 106/308 M; 260/29.6 M; 260/42.15
[58] Field of Search ............... 260/42.15, 29.6 MM, 260/29.6 M; 106/290, 308 N, 308 Q, 308 M

[56] References Cited

U.S. PATENT DOCUMENTS

| | | | |
|---|---|---|---|
| 3,324,074 | 6/1967 | McManimie | 260/42.15 |
| 3,389,116 | 6/1968 | Saha | 260/37 R |
| 4,048,136 | 9/1977 | Kobayashi | 260/42.15 |

*Primary Examiner*—James H. Derrington

[57] ABSTRACT

An improvement in coating compositions containing aluminum flake is provided. The improvement is coating the aluminum flake with a mono-ethylenically unsaturated silane and then reacting the silane coated flake with acrylic monomers having amine hydroxyl or epoxy groups to form an acrylic coating prior to placing the aluminum flake into the coating composition.

5 Claims, No Drawings

TREATMENT OF ALUMINUM FLAKE TO IMPROVE APPEARANCE OF COATING COMPOSITIONS

CROSS REFERENCE TO RELATED APPLICATIONS

This is a continuation of application Ser. No. 800,065, filed May 24, 1977, now abandoned, which is a continuation-in-part of Ser. No. 588,609 filed June 20, 1975 now abandoned.

BACKGROUND OF THE INVENTION

1. Field of the Invention

This invention relates to coating compositions, particularly to coating compositions containing aluminum flake, more particularly to an improvement in these coating compositions.

2. Prior Art

Pollution problems caused by conventional paints which utilize organic solvents are forcing the manufacturing industries, such as the automobile and truck manufacturing industries, to turn to
(1) dry powder coating compositions,
(2) water-based coating compositions that contain only small amounts of organic solvents, or
(3) high solids coating compositions, i.e., a composition that contains very little, if any, liquid carrier.

Aluminum flake has been utilized in conventional solvent-based coating compositions to provide high quality finishes with an exceptional glamor appearance. "Glamor" is a term used in the coating art to indicate that property of a metallic pigmented coating which causes the intensity of light reflected from the coated substrate to vary markedly according to the angle from which it is observed, as well as, providing sparkle and an illusion of depth in the coating. However, standard, i.e., untreated aluminum flake, provides poor glamor appearance in dry powder and high solids coating compositions, and is unstable in water-based coating compositions.

When standard aluminum flake is added to a dry powder coating composition, the coating prepared is usually poor in appearance and exhibits a salt and pepper effect due to ineffective mixing. Additionally, in both dry powder and high solids coating compositions, any incompatible material will float to the surface. This diminishes the glamor effect. In those coatings where the flake is not properly aligned, it will also break through the surface of the coating.

In water-based coating compositions, standard aluminum flake will both react with water in the composition to form hydrogen gas, particularly at elevated temperatures, creating a safety hazard, and tend to settle to form a hard cake in the water-based coating composition.

The improved coating composition of this invention overcomes these aforementioned problems of the art.

SUMMARY OF THE INVENTION

According to the present invention, there is provided an improvement in coating compositions containing aluminum flake; the improvement prior to placing the flake into the coating composition comprises:

coating the aluminum flake with mono-ethylenically unsaturated silane and reacting the silane coated flake with acrylic monomers having functional groups to form an acrylic polymer topcoat on the flake.

DETAILED DESCRIPTION OF THE INVENTION

The improved coating composition of this invention utilizes a treated aluminum flake. The treatment of the aluminum flake
(1) coated the flake,
(2) prevents undesired reactions between flake or its impurities with the remainder of the composition,
(3) removes incompatible materials from the surface of the flake, and
(4) provides an acrylic topcoating on the flake with organo functional groups on the surface which can react a polymer used in the coating composition.

This treatment prevents all of the previously mentioned problems and produces a coating having an excellent appearance.

Coating compositions containing aluminum flake are well known in the art, as evidenced by the following patent and patent applications:

Armour Application Ser. No. 632,195, filed 4-20-67 now abandoned; Pettit Application Ser. No. 536,321, filed 12-24-74, now U.S. Pat. Ser. No. 3,998,768 issued 12-21-76; Fang, Application Ser. No. 302,858, filed 11-1-72 now abandoned; Fang, Application Ser. No. 285,590, filed 9-1-72 now abandoned; Fang, U.S. Pat. No. 3,839,254, filed 9-1-72.

These coating compositions are applied to substrates according to conventional coating techniques; techniques in which, for example, the coating composition is sprayed, brush coated, flow coated, dip coated, or electrocoated onto a substrate. The substrate can be, for example, a primed or non-primed metal, glass, plastic or fiber reinforced plastic, plastic such as styrene, copolymers of styrene, polypropylene, and the like. These coating compositions are especially suited for use as exterior finishes of automobile or truck bodies.

Aluminum flake useful in this invention can be as dry particles or as a paste in which the aluminum particles are dispersed in an organic solvent. Usually the aluminum flake is in a paste, as it is most easily obtained commercially in that form. The percentage by weight of aluminum flake to total weight of paste is usually from 30–80%.

Aluminum flake itself is generally flat in shape and has an average largest dimension length greater than about 10 microns. Usually the particles will have a largest dimension from about 20 to 50 microns with some particles being as small as 1 to 5 microns in length. While it is preferred to use initial flake particles having an average largest dimension from 20 to 50 microns, larger particles can be used, up to 100 microns in length. Larger flake particles, however, may cause problems with surface distortion of the coating. Generally the amount of flake particles required to give any desired appearance effect depends on the density of the flake and its geometry. The important geometrical factor is the ratio of length to thickness (aspect ratio). Generally an increase in aspect ratio will result in a decrease in flake concentration in order to obtain the same appearance. The aluminum flake is usually present in a dry powder or a high solids coating composition at a concentration of about 0.05 to 10% and preferably in the range of about 0.1 to 2% by weight of the composition. For conventional and aqueous coating compositions, the flake concentration will normally be in the range of 0.1 to 4%.

Mono-ethylenically unsaturated silanes used to treat the aluminum flake have the formula RSiX₃ wherein R is a mono-ethylenically unsaturated group attached to the silicone atom in a thermally and hydrolytically stable manner and X is a hydrolyzable group. The R group can be separated from the silicone atom by an alkyl chain.

Silanes are applied onto the aluminum flake surface by means of dilute liquid solutions, i.e., solutions containing about 0.2 to 5.0% by weight of silane. Solubility and stability of the silane in the solution becomes an important consideration since silanes represent a variety of different chemical molecules, it is not surprising that solubilities also differ.

The following are general statements concerning silanes:

1. Of the factors which determine hydrolysis rate of silanes, solution pH is generally the strongest. For most silanes, maximum hydrolysis rate is achieved at a pH of three to five. Some silanes carry their own catalyst in the form of by-products of hydrolysis.

2. In time, all aqueous silane solutions will reach equilibrium levels of homopolymer (silane monomers which have reacted together through the silicon-functional groups to form a siloxane polymer).

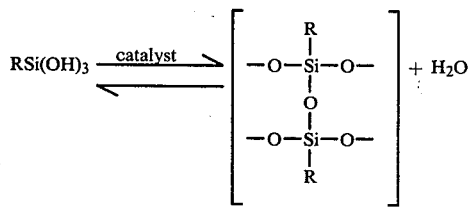

The following conditions effect this equilibrium:
 a. pH (a range of four to five generally favors maximum monomer content) and
 b. Silane concentrations.

Some of these homopolymers quickly lose water solubility as the degree of polymerization is increased. Weak polymeric gels which are insoluble may result. It is generally desirable to retain the silane as monomer or dimer, in order to preserve its coupling functionality.

The preferred silanes used to treat aluminum flake are:

(1) vinyltrimethoxysilane

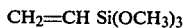

(2) vinyltrichlorosilane

(3) vinyltriethoxysilane

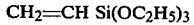

(4) vinyl tris(betamethoxyethoxy) silane

(5) gamma-methacryloxypropyl-trimethoxysilane

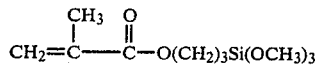

The preferred silanes is #5 above.

It is believed that this invention improves the appearance of coating compositions because the coated aluminum flake has on the acrylic coating surface pendant functional groups of amine, hydroxy, or epoxy. These pendant functional groups are capable of being reacted with the polymer of the coating composition.

The monoethylenically unsaturated silane, such as gamma-methacryloxypropyl-trimethoxysilane, forms a siloxane coating with pendent ethylenically unsaturated on the aluminum flake surface. A mixture of acrylic monomers, initiator, and chain transfer agents are added to the silane treated flake such that the monomers can react at the surface of the aluminum flake producing an acrylic coating. The types of monomers are varied so as to provide the desired type of reactive group at the surface.

Acrylic monomers which can be used along with acrylic monomers that provide amine, hydroxy or epoxy groups are alkyl acrylates and alkyl methacrylates having 1-12 carbon atoms in the alkyl groups. Typical alkyl acrylates and alkyl methacrylates are methyl methacrylate, ethyl methacrylate, propyl methacrylate isopropyl methacrylate, butyl methacrylate pentyl methacrylate, hexyl methacrylate, 2-ethylhexyl methacrylate, nonyl methacrylate, lauryl methacrylate, ethyl acrylate, propyl acrylate, butyl acrylate, pentyl acrylate, hexyl acrylate, octyl acrylate, nonyl acrylate lauryl acrylate and the like.

Typical acrylic monomers that provide hydroxyl groups are hydroxyalkyl acrylates and hydroxyalkyl methacrylates such as hydroxyethyl acrylate, hydroxypropyl acrylate, hydroxybutyl acrylate, hydroxyethyl methacylate, hydroxypropyl methacrylate, hydroxybutyl methacrylate and the like.

Glycidyl acrylate and glycidyl methacrylate are acrylic monomers that provide epoxy groups.

Typical monomers that provide amine groups are alkylaminoalkyl acrylates and methacrylates such as diethyaminoethyl methacrylate, dimethylaminoethyl methacrylate, diethylaminoethyl acrylate, dimethylaminoethyl acrylate, dipropylaminoethyl methacrylate, methylethylaminoethyl methacrylate, butylaminoethyl methacrylate, tertiary butylaminoethyl methacrylate and the like.

Generally polymerization initiators and chain transfer agents are used to form the acrylic coating on the flakes. Typical initiators are azo-bis-(α-gamma-dimethylvaleronitrile), benzoyl peroxide, t-butylperoxypivalate, azo-bis-isobutyronitrile, and the like. Typical chain transfer agents can be used to control the molecular weight, such as dodecyl mercaptan, and mercaptoethanol. Mercaptoethanol is preferred to provide acrylic polymers with terminal hydroxyl groups.

The reaction in which the silane is coated upon the aluminum flake utilizes at least 100%, preferably 200–1000%, more preferably 300–400%, of the quantity of silane required to form a monolayer on the surface area of the flake. The amount of silane required is determined by first measuring the surface area of the aluminum flake using conventional techniques, then determining the minimum surface area coverage of the silane to be used using conventional techniques, and then using the percentage desired of the minimum amount of silane required to cover the aluminum flake.

The surface area of aluminum flake is usually in the range of 1–10 meter $^2$/gram. The minimum surface area coverage of silane is usually in the range of about 200–500 meter $^2$/gram of silane depending on the chemical structure and molecular weight of the silane molecule.

The reaction is carried out for a period of time and at a temperature sufficient to coat the aluminum flake with the silane. Preferably, the temperature is about 50°–100° C. and the period of time is 1–5 hours. The lower the temperature, the longer the period of time required. Most preferably, the temperature is about 60° C. and the period of time is about 1 hour.

Conventional polymerization times and temperatures are used to form the acrylic coating on the flake. Generally temperatures of 50°–150° C. are used with a polymerization time of 0.5–4 hours.

It has been found that other treatments for aluminum flake improve the appearance of coating compositions containing the treated aluminum flake to varying degrees.

Dispersing aluminum flake in polar solvents, e.g., butyl cellosolve, ethyl cellosolve, cellosolve acetate, etc., has an effect in improving the appearance of both dry powder and high solids coating compositions.

Treating aluminum flake with ammonium phosphate provides improved appearance in dry powder coatings over formulations using conventional aluminum pastes. The treatment consists of displacing long chain organic acids which are commonly used to treat aluminum flake with the phosphate ion. The treatment removes material from the aluminum flake surface which causes poorer appearance because the material is incompatible with the vehicle system.

The following example illustrates the invention:

EXAMPLE

Mix together, in a 3-liter round bottom resin kettle (equipped with a Teflon ® stirrer, $N_2$ inlet, thermometer, reflux condenser, and addition funnel):

| | |
|---|---|
| 186.6 g. | Aluminum flake paste (Silberline SS-3199-A.R., sold by Silberline Manufacturing Company, Inc.) which has been washed with "Cellosolve" acetate. |
| 1,000 ml. | |

Stir the resulting mixture at 300 revolutions per minute under a slow stream of $N_2$ for 5–10 minutes until complete dispersion is affected.

Add slowly to the mixture

| | |
|---|---|
| 15.92 g. | Gamma-methacryloxypropyl-trimethoxy silane (A-174 Silane sold by Union Carbide Corporation) |
| .002 g. | Hydroquinone |

Stir the resulting slurry at room temperature (300 revolutions per minute) for 20 minutes, then heat slowly to 60° C. and maintain for 3 hours. Add a solution of

| | |
|---|---|
| 0.014 g. | Dimethylvaleronitrile |

-continued

| | |
|---|---|
| | (VAZO ® 52 sold by E. I. du Pont de Nemours and Company) |
| 10. ml. | Methyl "Cellosolve" acetate |

Then add dropwise over a period of 30 minutes, a solution of

| | |
|---|---|
| 4.11 g. | Methyl methacrylate |
| 1.39 g. | Ethylhexyl acrylate |
| 0.36 g. | Hydroxyethyl acrylate |
| 0.036 g. | VAZO ® 52 |
| 25. ml. | Methyl "Cellosolve" acetate |

When the addition is complete, maintain a temperature of 60° C. for 20 minutes. Cool to room temperature and wash the flake paste several times with methyl cellosolve acetate. The percent solids of the silane-coated aluminum flake paste is 67.5±0.2 %.

ESCA analysis of the coated flake paste produces the following results:

| Charge Corrected (C = 284.0) Binding Energies (eV) | | | | | | |
|---|---|---|---|---|---|---|
| $C_{1s}$ | $C_{1s}$ | $O_{1s}$ | $N_{1s}$ | $Al_{2p}$ | $Al_{2p}$ | $Si_{2p}$ |
| Hydrocarbon | Carbonyl | | Amine | Trivalent | Metal | Silane |
| 284.0 | 287.7 | 531.6 | 399.5 | 73.3 | 70.6 | 101.0 |

| Normalized Peak Intensities (Counts/Sec.) | | | | | | |
|---|---|---|---|---|---|---|
| $C_{1s}$ | $C_{1s}$ | $O_{1s}$ | $N_{1s}$ | $Al_{2p}$ | $Al_{2p}$ | $Si_{2p}$ |
| Hydrocarbon | Carbonyl | | Amine | Trivalent | Metal | Silane |
| 15086 | 1650 | 8430 | 106 | 5017 | 3302 | 383 |

The resulting coated flake was used in water based acrylic coating composition, acrylic powder coating composition and acrylic high solids coating composition. Each of the above compositions was applied to primed steel substrates and baked using conventional procedures. In each case a finish resulted that had a good appearance and excellent metallic glamour.

I claim:

1. An improvement in water based coating compositions containing aluminum flake, the improvement comprising:
    utilizing a coated aluminum flake;
    wherein the aluminum flake was coated with at least 100% of the quantity required to form a monolayer on the surface area of the flake of mono-ethylenically unsaturated silane and was reacted with acrylic monomers having functional groups to form an acrylic topcoat on the flake;
    wherein the silane is selected from the group consisting of vinyltrimethoxysilane, vinyltriethoxysilane, vinyltris (beta-methoxyethoxysilane) and gamma-methacryloxy-propyltrimethoxysilane.

2. The improvement of claim 1 wherein the silane is gamma-methacryloxypropyl-trimethoxysilane.

3. The improvement of claim 1 wherein the aluminum flake has a surface area of 1–10 meter$^2$/gram of aluminum flake,
    the silane has a minimum surface area coverage of 200–500 meter$^2$/gram of silane, and silane is present in a concentration of 200–1000% based on the minimum amount of silane required to form a monolayer on the aluminum flake.

4. The improvement of claim 1 in which the acrylic monomers are an alkyl acrylate or an alkyl methacrylate or mixtures thereof in combination with a glycidyl acrylate, glycidyl methacrylate, hydroxy alkyl acrylate, a hydroxy alkyl methacrylate, an alkyl amino alkyl acrylate or an alkyl amino alkyl methacrylate.

5. The improvement of claim 1 wherein the silane is gamma-methacryloxypropyltrimethoxysilane the aluminum flake has a surface area of 1–10 meter$^2$/gram of aluminum flake, the silane has a minimum surface area coverage of 200–500 meter$^2$/gram of silane and silane is present in a concentration of 200–1000% based on the minimum amount of silane required to form a monolayer on the aluminum flake and the acrylic monomers are methyl methacrylate, ethyl hexyl acrylate, and hydroxy ethyl acrylate.

* * * * *